United States Patent
Xu

(10) Patent No.: US 10,846,355 B2
(45) Date of Patent: Nov. 24, 2020

(54) METHOD AND DEVICE FOR PAGE DISPLAY

(71) Applicant: Alibaba Group Holding Limited, George Town (KY)

(72) Inventor: Xingxing Xu, Hangzhou (CN)

(73) Assignee: Alibaba Group Holding Limited, Georgetown (KY)

( * ) Notice: Subject to any disclaimer, the term of this patent is extended or adjusted under 35 U.S.C. 154(b) by 47 days.

(21) Appl. No.: 16/138,651

(22) Filed: Sep. 21, 2018

(65) Prior Publication Data

US 2019/0026381 A1   Jan. 24, 2019

Related U.S. Application Data

(63) Continuation of application No. PCT/CN2017/076225, filed on Mar. 10, 2017.

(30) Foreign Application Priority Data

Mar. 22, 2016   (CN) .......................... 2016 1 0166369

(51) Int. Cl.
  *G06F 15/16*   (2006.01)
  *G06F 16/955*   (2019.01)
  (Continued)

(52) U.S. Cl.
  CPC .......... *G06F 16/9566* (2019.01); *G06F 16/00* (2019.01); *H04L 9/3236* (2013.01); *H04L 67/02* (2013.01); *H04W 12/06* (2013.01)

(58) Field of Classification Search
  CPC ...... H04L 9/3236; H04L 67/02; H04W 12/06; G06F 16/9565; G06F 16/00
  (Continued)

(56) References Cited

U.S. PATENT DOCUMENTS

2010/0049782 A1   2/2010 Li
2012/0066296 A1   3/2012 Appleton et al.
  (Continued)

FOREIGN PATENT DOCUMENTS

CN   101127603   2/2008
CN   101189606   5/2008
  (Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
  (Continued)

*Primary Examiner* — Alan S Chou
(74) *Attorney, Agent, or Firm* — Fish & Richardson P.C.

(57) ABSTRACT

A uniform resource locator (URL), identifying a requested web page, is identified by a device. A requested location within the requested web page is identified by the device. A modified URL, identifying the requested web page and including a URL parameter corresponding to the requested location and configured to enable a server associated with the modified URL to identify the requested location in the requested web page, is generated. A request, including the modified URL including the URL parameter, is sent by the device to the server. A response, including the requested web page identified by the modified URL and an identifier of the requested location in the requested web page, is received by the device from the server. The identifier is different than the URL parameter. The requested location of the requested web page received from the server based on the included identifier is displayed by the device.

18 Claims, 5 Drawing Sheets

(51) Int. Cl.
*G06F 16/00* (2019.01)
*H04L 9/32* (2006.01)
*H04L 29/08* (2006.01)
*H04W 12/06* (2009.01)

(58) Field of Classification Search
USPC .......................................................... 709/201
See application file for complete search history.

(56) References Cited

U.S. PATENT DOCUMENTS

| | | | |
|---|---|---|---|
| 2012/0143997 A1* | 6/2012 | Leighton | H04L 67/1023 |
| | | | 709/219 |
| 2014/0280739 A1 | 9/2014 | Ljubin | |
| 2014/0365777 A1 | 12/2014 | Cha et al. | |
| 2015/0195340 A1 | 7/2015 | Tulchinsky et al. | |
| 2015/0207660 A1* | 7/2015 | Sundaram | H04L 67/2814 |
| | | | 709/203 |
| 2016/0316035 A1* | 10/2016 | Tang | G06F 16/9574 |

FOREIGN PATENT DOCUMENTS

| | | |
|---|---|---|
| CN | 101662460 | 3/2010 |
| CN | 102810089 | 12/2012 |
| CN | 103430177 | 12/2013 |
| CN | 103856541 | 6/2014 |
| CN | 104468804 | 3/2015 |
| CN | 105373533 | 3/2016 |
| TW | 200830855 | 7/2008 |
| WO | WO 2012125601 | 9/2012 |
| WO | WO 2014165391 | 10/2014 |
| WO | WO 2014168774 | 10/2014 |

OTHER PUBLICATIONS

Nakamoto, "Bitcoin: A Peer-to-Peer Electronic Cash System," www.bitcoin.org, 2005, 9 pages.

International Search Report of the International Searching Authority issued in International Application No. PCT/CN2017/076225 dated Jun. 14, 2018; 10 pages.

Extended European Search Report in European Application No. 17769318.1, dated Oct. 24, 2019, 8 pages.

Ford, Chevtek.io [online], "How to persist URL hash fragments across a login redirect," Aug. 2014, retrieved on Oct. 24, 2019, retrieved from URL<https://chevtek.io/how-to-persist-url-hash-fragments-across-a-login-redirect/>, 12 pages.

PCT International Preliminary Report on Patentability in International Application No. PCT/CN2017/076225, dated Sep. 25, 2018, 10 pages (with English translation).

* cited by examiner

METHOD AND DEVICE FOR PAGE DISPLAY

CROSS-REFERENCE TO RELATED APPLICATIONS

This application is a continuation of PCT Application No. PCT/CN2017/076225, filed on Mar. 10, 2017, which claims priority to Chinese Patent Application No. 201610166369.9, filed on Mar. 22, 2016, and each application is hereby incorporated by reference in its entirety.

TECHNICAL FIELD

The present application relates to the field of computer technologies, and in particular, to a method and device for page display.

BACKGROUND

Currently, the main method used by a user to obtain information is browsing pages in each server by using intelligent terminals such as a mobile phone or a computer. Because the pages can include a large amount of information and links of the information, information requirements of the user are greatly satisfied, facilitating the user in obtaining the information.

In actual applications, a page usually includes a large amount of information. If the user needs to obtain a certain piece of information from the page, the user needs to view information one by one on the page. Consequently, it is inconvenient for the user to obtain the information. To help the user to quickly obtain specified information from the page, currently a hash attribute is usually added to a uniform resource locator (URL) of a page corresponding to the specified information. A terminal can locate the specified information on the page by using the hash attribute. Therefore, after the user enters the URL including the hash attribute in the terminal, the terminal obtains the page corresponding to the URL from a server based on the URL. Because the server cannot identify the hash attribute in the URL, after the server returns the page to the terminal, the terminal searches the page based on the hash attribute to display the located specified information to the user. As such, when the user needs to obtain information, the terminal can help the user to locate the information, which is convenient.

However, in an actual process, when the terminal obtains the information from the server by using the URL entered by the user, redirection usually occurs. For example, the user needs to log in to the server before the server returns a page corresponding to information that is to be obtained by the user to the terminal. A specific process is shown in FIG. 1.

FIG. 1 is a page display process in the existing technology. The process includes the following steps.

S101. A terminal sends an original URL entered by a user to a server, where the original URL includes a hash attribute.

When the user needs to obtain a certain piece of specified information from the server, the user can enter an original URL of the specified information in the terminal. The URL includes a hash attribute that can be used by the terminal to locate the specified information on a page. After receiving the original URL, the terminal can send the original URL to the server, to access the server based on the original URL.

S102. The server returns a redirection URL that includes 302 redirection header information to the terminal based on the received original URL.

After receiving the original URL, the server determines that the terminal needs to log in to the server. Therefore, the server returns the redirection URL that includes the 302 redirection header information to the server. A page corresponding to the redirection URL is a login page.

S103. The terminal accesses a page corresponding to the redirection URL based on the redirection URL.

When receiving the redirection URL, the terminal can visit the login page corresponding to the redirection URL based on the redirection URL, to complete the login on the page.

S104. After it is detected that the terminal logs in to the server by using the page, return a URL that includes the 302 redirection header information to the terminal, where the URL is the original URL excluding the hash attribute.

S105. The terminal visits a page corresponding to the URL based on the URL, and displays the page.

After receiving the URL returned by the server, the terminal can obtain the page corresponding to the URL from the server based on the URL, and display the page.

In the described process, the terminal can obtain the page of the specified information from the server. However, because the server cannot identify the hash attribute in the URL, in step S104, when the server returns the URL to the terminal, the server removes the hash attribute included in the original URL and then adds the 302 redirection header information, to obtain the URL that includes the 302 redirection header information and return the URL to the terminal. As such, when accessing the server based on the URL that includes the 302 redirection header information, the terminal cannot perform information locating on the page returned by the server. To be specific, the original URL including the hash attribute and previously entered by the user in the terminal is replaced with the URL excluding the hash attribute and returned by the server. Therefore, the terminal cannot perform, based on the hash attribute, information locating on the page returned by the server. As a result, the user can merely manually search for the needed specified information on the information page. Consequently, it is inconvenient for the user to obtain the information.

SUMMARY

Implementations of the present application provide a method and device for page display, to resolve a problem in the existing technology that when 302 redirection occurs in a process that a terminal obtains a page from a server, the terminal cannot perform information locating on the page returned by the server.

An implementation of the present application provides a method for page display, including: receiving, by a terminal, a URL entered by a user, where the URL includes a hash attribute; replacing the hash attribute included in the URL with a URL parameter based on a predetermined rule; sending the replaced URL to a server, so after receiving the replaced URL, the server locates a page corresponding to the replaced URL based on the replaced URL, and returns the located page to the terminal; and displaying the located page returned by the server.

An implementation of the present application provides a method for page display, including: receiving, by a server, a replaced URL sent by a terminal, where the replaced URL is obtained after the terminal replaces a hash attribute in an original URL entered by a user with a URL parameter; determining a page corresponding to the replaced URL based on the replaced URL; locating the page based on the URL parameter included in the replaced URL; and returning the located page to the terminal for display.

An implementation of the present application provides a device for page display, including: a receiving module, configured to receive a URL entered by a user, where the URL includes a hash attribute; a replacement module, configured to replace the hash attribute included in the URL with a URL parameter based on a predetermined rule; a sending module, configured to send the replaced URL to a server, so after receiving the replaced URL, the server locates a page corresponding to the replaced URL based on the replaced URL, and returns the located page to the device; and a display module, configured to display the located page returned by the server.

An implementation of the present application provides a device for page display, including: a receiving module, configured to receive a replaced URL sent by a terminal, where the replaced URL is obtained after the terminal replaces a hash attribute in an original URL entered by a user with a URL parameter; a determining module, configured to determine a page corresponding to the replaced URL based on the replaced URL; a location module, configured to locate the page based on the URL parameter included in the replaced URL; and a return module, configured to return the located page to the terminal for display.

The implementations of the present application provide the method and device for page display. In the method, the terminal replaces the hash attribute included in the received URL with the URL parameter, and sends the replaced URL to the server, so the server returns the page corresponding to the replaced URL to the terminal for display. It can be seen from the described method that the terminal can replace the hash attribute included in the received URL with the URL parameter. Therefore, after receiving the replaced URL, the server can perform information locating on the page corresponding to the replaced URL by using the URL parameter included in the replaced URL. To be specific, when redirection occurs in the process that the terminal accesses the server, the server can replace the terminal to complete information locating on the page. As such, even if redirection occurs, the page eventually obtained by the terminal is a page obtained after the information locating, so the user does not need to search for the needed information on the page, facilitating the user in obtaining the information.

BRIEF DESCRIPTION OF DRAWINGS

The accompanying drawings described here are intended to provide a further understanding of the present application, and constitute a part of the present application. The illustrative implementations of the present application and descriptions of the implementations of the present application are intended to describe the present application, and do not constitute a limitation on the present application.

DESCRIPTION OF IMPLEMENTATIONS

To make the objectives, technical solutions, and advantages of the present application clearer, the following describes the technical solutions of the present application with reference to specific implementations and corresponding accompanying drawings. Apparently, the described implementations are some rather than all of the implementations of the present application. All other implementations obtained by a person of ordinary skill in the art based on the implementations of the present application without creative efforts shall fall within the protection scope of the present application.

Figure 1:
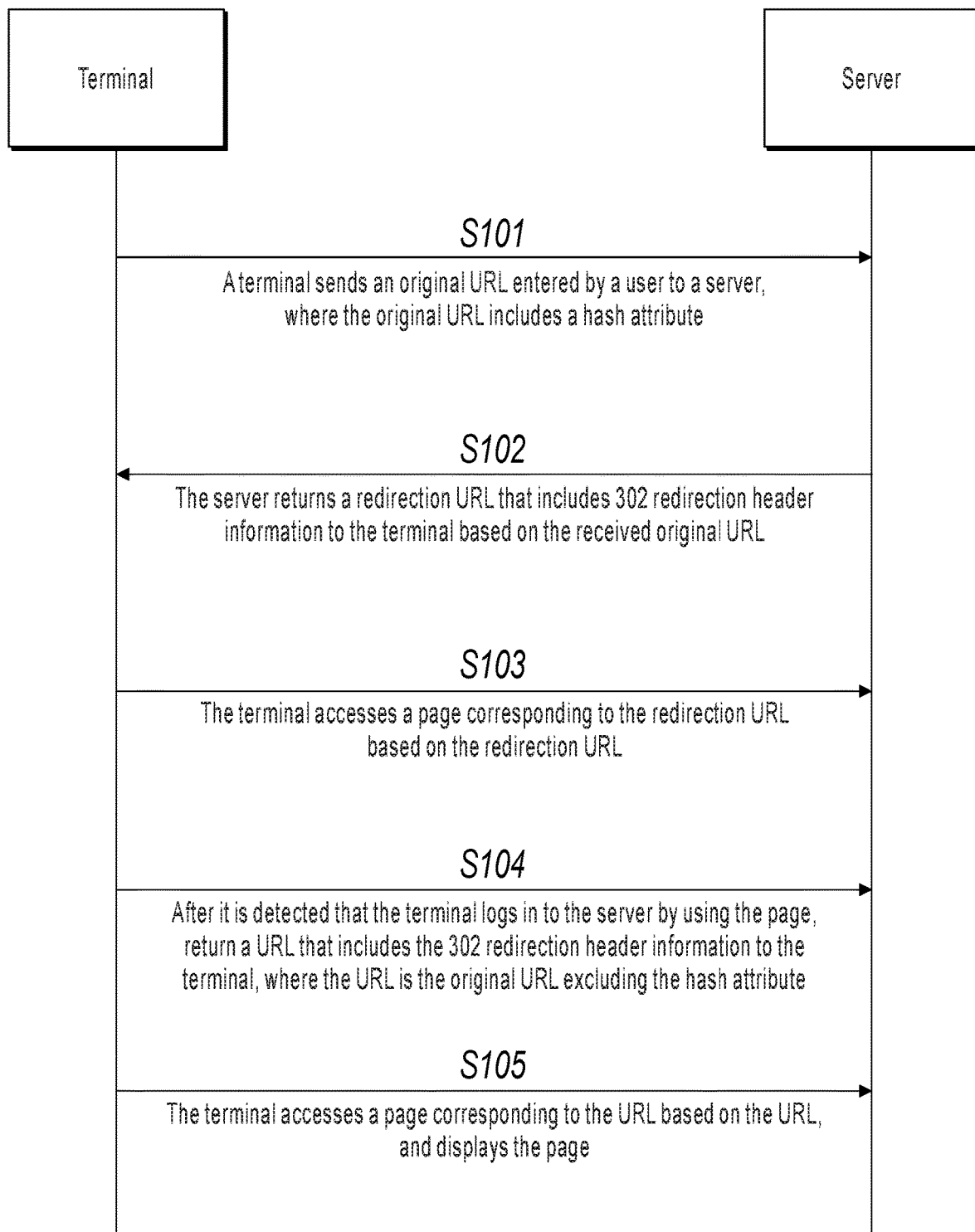
FIG. 1 is a page display process in the existing technology.
Figure 2:
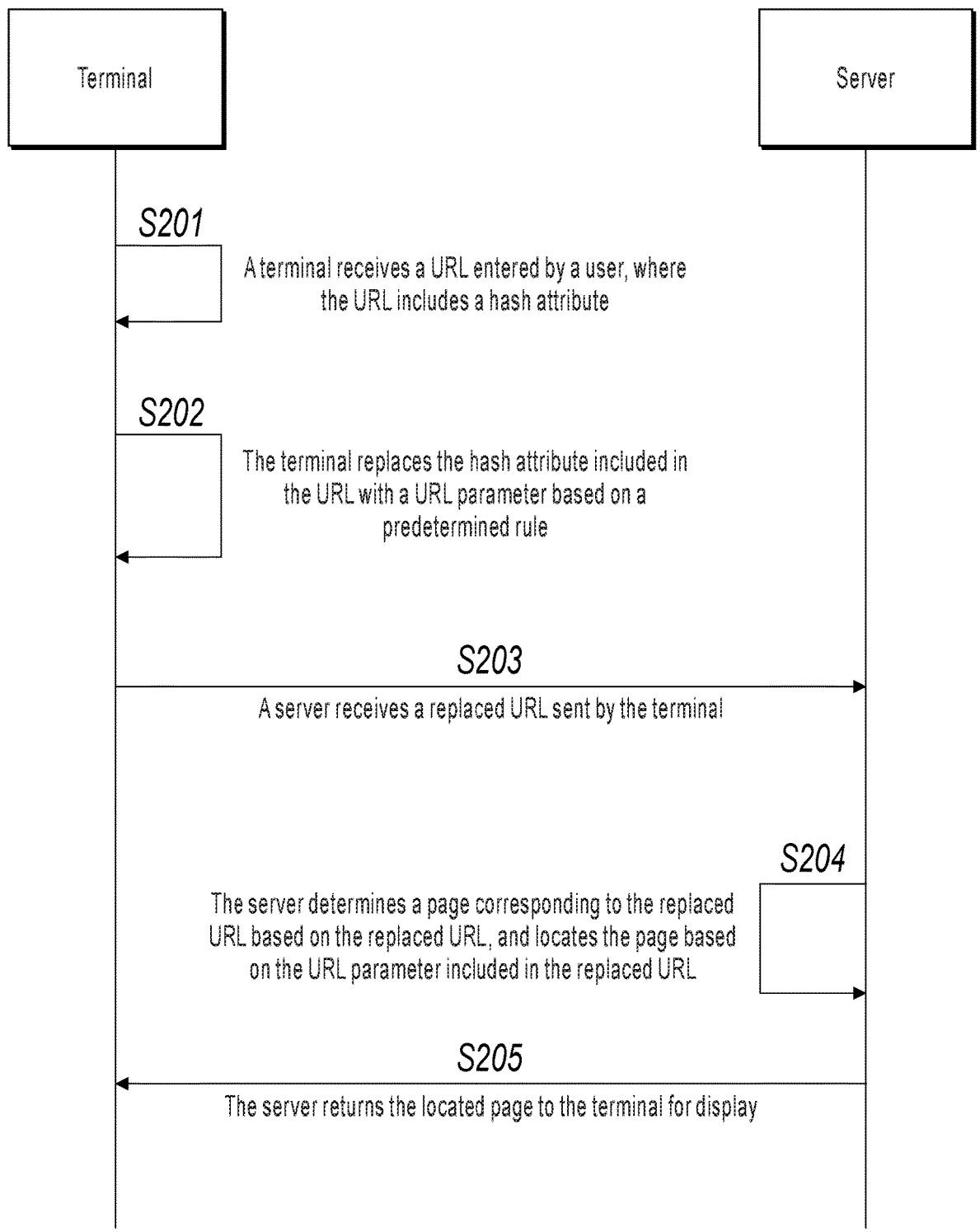
FIG. 2 is a page display process according to an implementation of the present application.

FIG. 2 is a page display process according to an implementation of the present application. The process includes the following steps.

S201. A terminal receives a URL entered by a user, where the URL includes a hash attribute.

In actual applications, when the user needs to obtain a certain piece of specified information from a server, the user can enter a URL corresponding to the specified information in the terminal, and the terminal accesses the server by using the URL and obtains a page corresponding to the URL from the server. As such, the user can obtain the specified information. The URL includes a hash attribute that can enable the terminal to locate the specified information on the page returned by the server. The terminal mentioned here can be an intelligent device such as a computer, a mobile phone, or a tablet computer, and the URL entered by the user can be received by a client or a browser installed on the terminal.

S202. The terminal replaces the hash attribute included in the URL with a URL parameter based on a predetermined rule.

After sending the URL entered by the user to the server, the terminal can replace, based on the predetermined rule and a response message returned by the server, the hash attribute included in the URL with the URL parameter that can enable the server to perform information locating on a page corresponding to the URL. The response message returned by the server is returned to the terminal when the server determines, after receiving the URL sent by the terminal, that the URL needs to be redirected.

To resolve a problem in the existing technology that information locating cannot be performed on a page returned by the server when 302 redirection occurs in a process that the terminal obtains the page from the server, in the present implementation of the present application, the terminal can replace the hash attribute in the received URL with the URL parameter that can enable the server to perform information locating on the page corresponding to the URL. As such, after receiving the replaced URL, the server can complete information locating on the page corresponding to the URL based on the URL parameter in the replaced URL. A process of replacing the hash attribute included in the URL with the URL parameter can be executed by an application (APP) or a browser in the terminal. To be specific, the APP or the browser can execute predetermined code to replace the hash attribute included in the URL that is received by the terminal with the URL parameter, to obtain the replaced URL. To help the user to obtain the replaced URL by using an existing browser, the existing browser can be improved. For example, a module that can replace the hash attribute included in the URL with the URL parameter is integrated into the browser, so the browser can obtain the replaced URL.

Previously, the terminal can determine whether redirection occurs when the terminal currently accesses the server based on the URL, to be specific, the terminal determines whether the server performs 302 redirection on the URL after receiving the URL sent by the terminal. Therefore, the terminal can send the URL to the server after receiving the URL entered by the user. After receiving the URL, the server can determine whether the URL needs to be redirected. When determining that the URL needs to be redirected, the server can return a response message to the terminal. After receiving the response message, the terminal can accordingly determine, based on the response message, that redirection occurs when the terminal currently accesses the server based on the URL, to further determine that the hash attribute included in the URL entered by the user needs to be replaced with the URL parameter. Therefore, the terminal can replace, based on the predetermined rule, the hash attribute included in the URL with the URL parameter that can enable the server to perform information locating on the page corresponding to the URL.

For example, assume that the URL entered by the user and received by the terminal is "http://a.com/index.html#fragment", the part following "#" in the URL is the hash attribute included in the URL. After receiving the URL, the terminal can send the URL to the server corresponding to the URL. After receiving the URL, the server identifies that the terminal needs to log in to the server before accessing the server based on the URL, that is, the server determines that 302 redirection needs to be performed on the URL sent by the terminal. Therefore, the server can return a response message to the terminal to indicate that the terminal needs to log in to the server before accessing the server. To be specific, 302 redirection occurs when the terminal currently accesses the server based on the URL. After receiving the response message, the terminal can determine that 302 redirection occurs in the current access, and therefore the terminal can replace the hash attribute "#fragment" included in the URL with the URL parameter "?_fragment=fragment" based on the predetermined rule, to obtain the replaced URL "http://a.com/index.html?_fragment=fragment".

S203. A server receives the replaced URL sent by the terminal.

After replacing the hash attribute included in the URL with the URL parameter, the terminal can send the replaced URL to the server. When 302 redirection occurs in the process that the terminal obtains the information from the server, after receiving the replaced URL, the server does not immediately return the page corresponding to the replaced URL to the terminal, but needs the terminal to complete a specified operation on a specified page before allowing the terminal to access the server. Therefore, after receiving the replaced URL, the server can return a redirection URL that includes 302 redirection header information to the terminal, so the terminal can obtain a specified page corresponding to the redirection URL based on the redirection URL, to complete the specified operation on the specified page. Then, after the terminal completes the specified operation on the specified page corresponding to the redirection URL, a replaced URL that includes the 302 redirection header information can be returned to the terminal. Correspondingly, the terminal can jump to a page corresponding to the replaced URL based on the replaced URL that includes the 302 redirection header information, that is, obtain the page corresponding to the replaced URL from the server.

Still referring to the described example, after the terminal sends the replaced URL "http://a.com/index.html?_fragment=fragment" to the server, the server determines that the terminal needs to log in to the server before obtaining the page corresponding to the URL. To be specific, the user needs to log in to the server, so the server can accordingly return the page corresponding to the URL to the user. Therefore, the server returns the redirection URL that includes the 302 redirection header information to the terminal, and the redirection URL is a URL corresponding to the login page. When receiving the redirection URL that includes the 302 redirection header information, the terminal can jump to the login page corresponding to the redirection URL based on the redirection URL and then complete a corresponding login operation (that is, the specified operation mentioned above) on the login page. In this case, the server detects the login operation of the terminal, and when the server detects that the terminal completes the login operation on the login page, the server can return the replaced URL that includes the 302 redirection header information to the terminal. Then, the terminal can successfully jump to the page corresponding to the replaced URL based on the replaced URL "http://a.com/index.html?_fragment=fragment", that is, obtain the page corresponding to the replaced URL from the server. It can be seen from here that the URL parameter "?_fragment=fragment" included in the replaced URL "http://a.com/index.html?_fragment=fragment" can be identified by the server, and correspondingly, the server can locate the information needed by the user on the page corresponding to the URL and based on the URL parameter "?_fragment=fragment". Therefore, even if redirection occurs in the process that the terminal obtains the information from the server, the server can replace the terminal to locate the specified information based on the URL parameter, so in a subsequent process, the terminal can accurately display information that is to be obtained by the user to the user.

S204. The server determines a page corresponding to the replaced URL based on the replaced URL, and locates the page based on the URL parameter included in the replaced URL.

When the terminal resends the replaced URL to the server (to be specific, after completing the specified operation on the specified page corresponding to the redirection URL, the terminal sends the replaced URL to the server based on the replaced URL returned by the server and including the 302 redirection header information), the server can determine the page corresponding to the replaced URL based on the replaced URL. In addition, the server locates the specified information that is to be obtained by the user on the page based on the URL parameter included in the replaced URL. As such, in subsequent step S205, the server returns the located page to the terminal for display. Because the server can identify the URL parameter, the server can locate the information that is to be obtained by the user on the page corresponding to the replaced URL and based on the URL parameter included in the replaced URL. As such, even if redirection occurs in the process that the terminal obtains the information from the server, the terminal can accurately display the information that is to be obtained by the user to the user on the page, facilitating the user in obtaining the information.

S205. The server returns the located page to the terminal for display.

After the server completes information locating on the page corresponding to the replaced URL based on the URL parameter included in the replaced URL, the server can restore the replaced URL to the original URL based on the predetermined rule, namely, the URL entered by the user in the terminal; and then return the original URL and the located page to the terminal for display.

The server eventually needs to return the page corresponding to the information that is to be obtained by the user to the terminal. Therefore, the server needs to return the located page to the terminal for display after completely locating the information that is to be obtained by the user. In addition, the server further needs to restore the replaced URL to the URL entered by the user in the terminal (namely, the original URL mentioned above). As such, in actual applications, when the user enters a URL in the terminal to obtain information, a page returned by the server and received by the terminal needs to correspond to the URL. To be specific, normally, when the terminal displays the page, a URL displayed to the user needs to be consistent with the URL entered by the user. However, in the present implementation of the present application, when obtaining the information from the server, the terminal needs to replace the hash attribute included in the URL entered by the user with the URL parameter, in other words, the URL entered by the user is changed. Therefore, after receiving the replaced URL, the server merely returns the page corresponding to the replaced URL to the terminal. As such, the replaced URL corresponding to the page is different from the URL previously entered by the user. Therefore, when the terminal displays the page returned by the server, the displayed URL is also different from the URL previously entered by the user. Therefore, when the user identifies that the URL corresponding to the page currently displayed by the terminal is inconsistent with the URL previously entered by the user, the user possibly questions the page currently displayed by the terminal. Consequently, it is inconvenient for the user to obtain the information.

To avoid the described problem, in the present implementation of the present application, in addition to returning the located page to the terminal, the server further needs to restore the replaced URL to the original URL based on the predetermined rule, namely, the URL entered by the user in the terminal; and returns the original URL together with the located page to the terminal, so the terminal displays the page and the original URL after receiving the located page and the original URL. As such, when the user views the page and the URL displayed by the terminal, because the URL displayed by the terminal is the same as the URL previously entered by the user, the user considers that the page currently displayed by the terminal is a page that needs to be obtained by the user, and therefore views information on the page.

It is worthwhile to note that information locating in the existing technology is completed by the terminal based on the hash attribute included in the URL. In the present implementation of the present application, when 302 redirection occurs, information locating is completed by the server based on the URL parameter included in the replaced URL. To be specific, when 302 redirection occurs in the process that the terminal obtains the information from the server, the terminal can replace the hash attribute included in the URL entered by the user with the URL parameter, to enable the server to complete information locating. As such, the terminal can still display the located page to the user eventually, so the user obtains the specified information from the page.

It can be seen from the described method that the terminal can replace the hash attribute included in the received URL with the URL parameter. Therefore, after receiving the replaced URL, the server can perform information locating on the page corresponding to the replaced URL by using the URL parameter included in the replaced URL. To be specific, when redirection occurs in the process that the terminal accesses the server, the server can replace the terminal to complete information locating on the page. As such, even if redirection occurs, the page eventually obtained by the terminal is a page obtained after the information locating, so the user does not need to search for the needed information on the page, facilitating the user in obtaining the information.

It is worthwhile to note that in step S202, after the terminal sends the received URL to the server, if the server identifies that no redirection occurs in the present access performed by the terminal based on the URL, the server can directly return the page corresponding to the URL to the terminal. When the terminal receives the page returned by the server, the URL entered by the user and received by the terminal does not change because no redirection occurs. Therefore, the terminal can perform locating on the page returned by the server based on the hash attribute included in the URL. To be specific, the terminal locates, on the page, the information that needs to be obtained by the user, and then displays the located page to the user.

The method for page display provided in the present implementation of the present application is described above. Based on the same idea, as shown in FIG. 3 and FIG. 4, an implementation of the present application further provides a device for page display.

Figure 3:
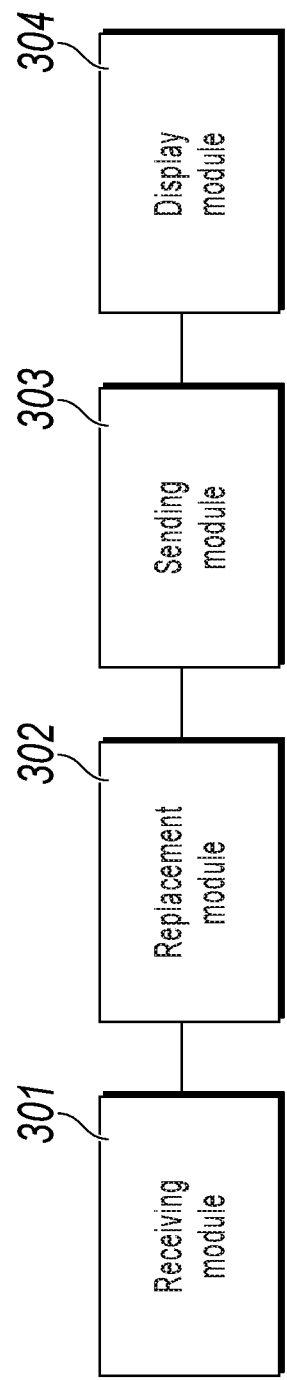
FIG. 3 is a schematic structural diagram illustrating a device for page display, according to an implementation of the present application.
Figure 4:
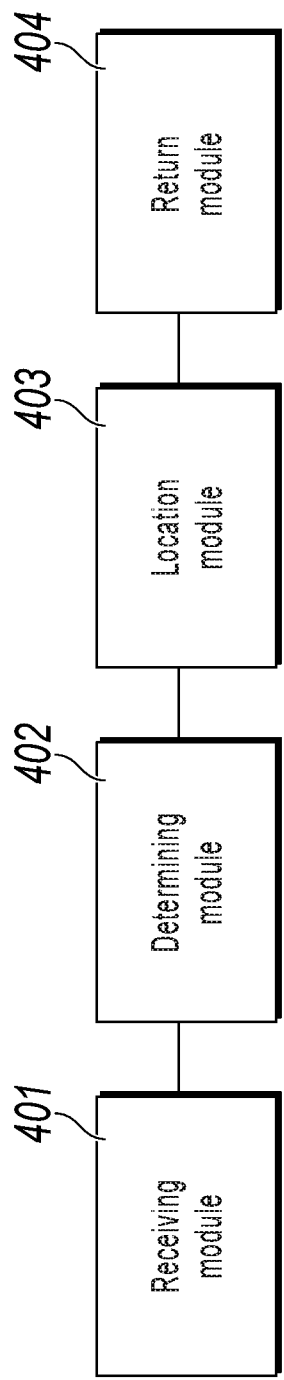
FIG. 4 is a schematic structural diagram illustrating a device for page display, according to an implementation of the present application.

FIG. 3 is a schematic structural diagram illustrating a device for page display, according to an implementation of the present application. The device includes: a receiving module 301, configured to receive a URL entered by a user, where the URL includes a hash attribute; a replacement module 302, configured to replace the hash attribute included in the URL with a URL parameter based on a predetermined rule; a sending module 303, configured to send the replaced URL to a server, so after receiving the replaced URL, the server locates a page corresponding to the replaced URL based on the replaced URL, and returns the located page to the device; and a display module 304, configured to display the located page returned by the server.

The replacement module 302 is configured to replace the hash attribute included in the URL with the URL parameter based on the predetermined rule when a response message returned by the server is received, where the response message is returned to the device when the server determines that the URL needs to be redirected after receiving the URL sent by the device.

The receiving module 301 is further configured to receive a URL returned by the server before the display module 304 displays the located page returned by the server, where the URL returned by the server is a URL obtained after the server restores the URL parameter in the replaced URL to the hash attribute after receiving the replaced URL.

The display module 304 is configured to display the located page returned by the server and the URL returned by the server.

FIG. 4 is a schematic structural diagram illustrating a device for page display, according to an implementation of the present application. The device includes the following: a receiving module 401, configured to receive a replaced URL sent by a terminal, where the replaced URL is obtained after the terminal replaces a hash attribute in an original URL entered by a user with a URL parameter; a determining module 402, configured to determine a page corresponding to the replaced URL based on the replaced URL; a location module 403, configured to locate the page based on the URL parameter included in the replaced URL; and a return module 404, configured to return the located page to the terminal for display.

The receiving module 401 is further configured to receive an original URL sent by the terminal before the receiving module 401 receives the replaced URL sent by the terminal, where the original URL is a URL including a hash attribute, and when it is determined, based on the original URL, that the original URL needs to be redirected, return a response message to the terminal.

The receiving module 401 is configured to receive the replaced URL returned by the terminal after receiving the response message.

The return module 404 is configured to restore the replaced URL to the original URL based on a predetermined rule; and return the located page and the original URL to the terminal for display.

The implementations of the present application provide the method and device for page display. In the method, the terminal replaces the hash attribute included in the received URL with the URL parameter, and sends the replaced URL to the server, so the server returns the page corresponding to the replaced URL to the terminal for display. It can be seen from the described method that the terminal can replace the hash attribute included in the received URL with the URL parameter. Therefore, after receiving the replaced URL, the server can perform information locating on the page corresponding to the replaced URL by using the URL parameter included in the replaced URL. To be specific, when redirection occurs in the process that the terminal accesses the server, the server can replace the terminal to complete information locating on the page. As such, even if redirection occurs, the page eventually obtained by the terminal is a page obtained after the information locating, so the user does not need to search for the needed information on the page, facilitating the user in obtaining the information.

In a typical configuration, a computing device includes one or more central processing units (CPU), an input/output interface, a network interface, and a memory.

The memory can be in a form such as a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a parallel random-access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that a computing device can access. As described in the specification, the computer readable medium does not include a transitory computer readable medium (transitory media) such as a modulated data signal and a carrier.

It is further worthwhile to note that the terms "include", "comprise", or their any other variant is intended to cover a non-exclusive inclusion, so a process, a method, an article, or a device that includes a list of elements not only includes those elements but also includes other elements that are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer usable program code.

The previous descriptions are merely implementations of the present application, and are not intended to limit the present application. For a person skilled in the art, the present application can have various changes and changes. Any modification, equivalent replacement, or improvement made without departing from the spirit and principle of the present application shall fall within the protection scope of the claims of the present application.

Figure 5:
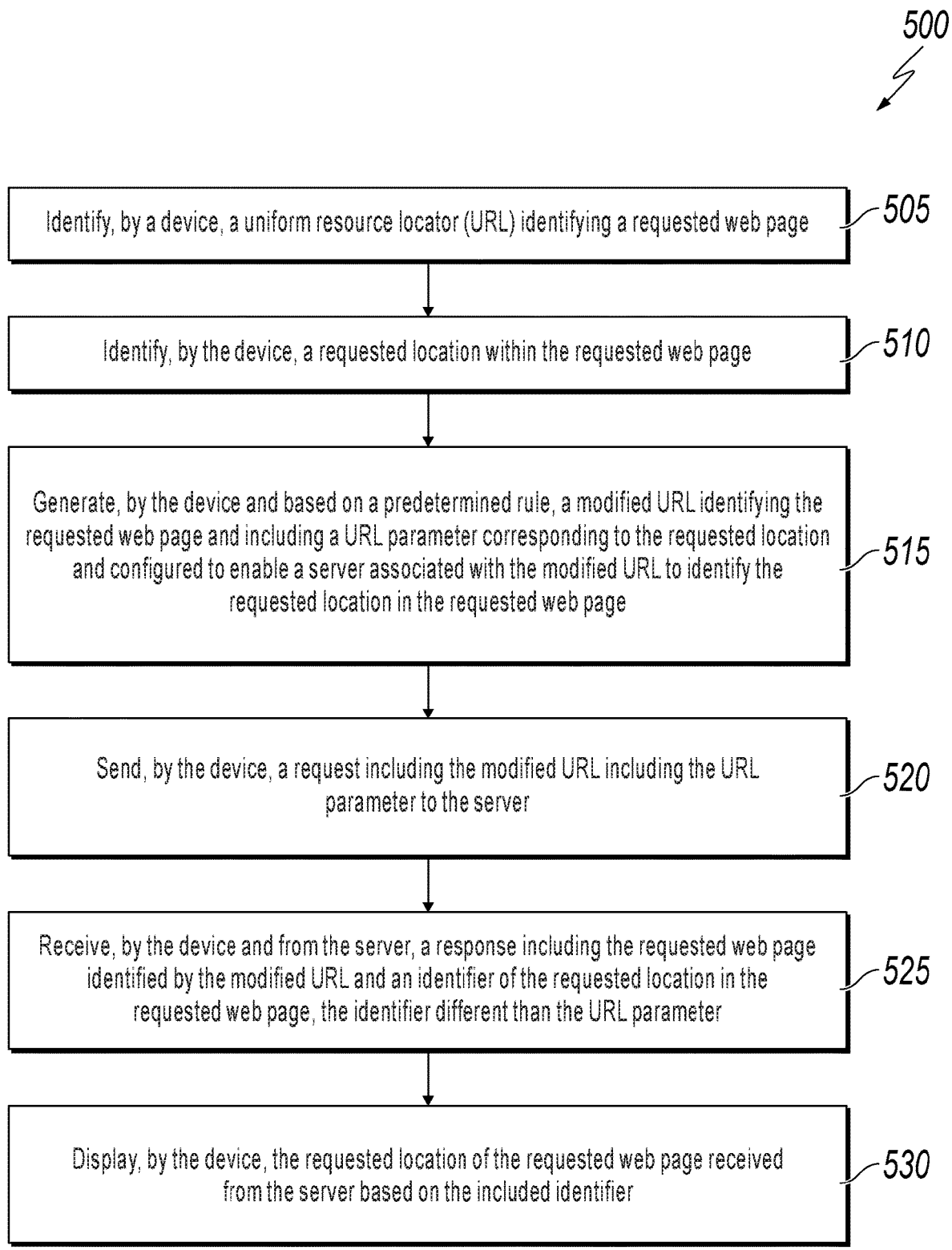
FIG. 5 is a flowchart illustrating an example of a computer-implemented method for displaying a page associated with a uniform resource locator (URL) including a hash attribute, according to an implementation of the present disclosure.

FIG. 5 is a flowchart illustrating an example of a computer-implemented method 500 for displaying a page associated with a uniform resource locator (URL) including a hash attribute, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 505, a uniform resource locator (URL) is identified by a device. The URL can identify a requested web page. In some implementations, the URL can be identified from user input to an application (such as, a browser, an application client) executing on the device. For example, a user can input a URL, corresponding to a requested web page, through a web browser executing on the device. The device can be a computer, a mobile phone, a tablet, or any other smart device. From 505, method 500 proceeds to 510.

At 510, a requested location within the requested web page is identified by the device. In some implementations, the requested location can be identified from user input. The requested location can be a hash attribute included in the URL input by the user. For example, if the URL identified by the device is "http://a.com/index.html#fragment", the part "#fragment" is the hash attribute included in the URL input by the user. The hash attribute in the URL can be associated with the requested location within the requested web page. For example, the hash attribute can be used by the device to identify the requested location within the requested web page. From 510, method 500 proceeds to 515.

At 515, a modified URL is generated by the device based on a predetermined rule. The modified URL can identify the requested web page, and include a URL parameter corresponding to the requested location. The URL parameter can be configured to enable a server associated with the modified URL to identify the requested location in the requested web page. In some implementations, the server cannot identify the hash attribute in the URL. In other words, the server cannot use the hash attribute to identify the requested location within the requested web page. The server, however, can identify the URL parameter in the modified URL. In other words, the server can use the URL parameter to identify the requested location within the requested web page. In some implementations, the predetermined rule can be a rule that matches a hash attribute to a corresponding URL parameter. Both the hash attribute and the corresponding URL parameter are associated with the requested location within the requested web page. For example, if a URL is "http://a.com/index.html#fragment" with a hash attribute "#fragment" that corresponds to a requested location within a requested web page, the device can generate a modified URL "http://a.com/index.html?_fragment=fragment" based on the predetermined rule. The modified URL includes a URL parameter "?_fragment=fragment" that corresponds to the requested location within the requested web page. In some implementations, generating a modified URL can be performed by an application or a browser of the device.

In some implementations, a redirect response can be received by the device from the server. The redirect response can include a redirection URL. In such a situation and in some implementations, the redirection URL can be identified as the URL identifying the requested web page. The requested location in the requested web page can be identified prior to receiving the redirect response. In response to receiving the redirect response, the modified URL including the URL parameter can be generated by the device based on the predetermined rule. For example, the server can make a determination as to whether accessing the URL by the device needs to be redirected (such as, the device needs to log in to the server before accessing the server based on the URL). If it is determined that accessing the URL by the device does not need to be redirected, the server can return the requested web page identified by the URL. Otherwise, if it is determined that accessing the URL by the device needs to be redirected, the server can send a redirect response to the device. In some implementations, the redirect response can include HTTP 302 redirection header information. From 515, method 500 proceeds to 520.

At 520, a request that includes the modified URL is sent by the device to the server. The modified URL includes the URL parameter. From 520, method 500 proceeds to 525.

At 525, a response is received by the device from the server. The response can include the requested web page identified by the modified URL and an identifier of the requested location in the requested web page. The identifier can be different than the URL parameter. In some implementations, the identifier of the requested location in the requested web page in the response from the server can be the hash attribute associated with the requested location. For example, the server can determine the requested web page based on the modified URL, and determine the requested location in the requested web page based on the URL parameter in the modified URL, but not the hash attribute in the URL. From 525, method 500 proceeds to 530.

At 530, the requested location of the requested web page received from the server is displayed by the device based on the included identifier. In some implementations, the requested location of the requested web page and a restored URL can be received by the device from the server. For example, the server can generate a restored URL by replacing the URL parameter in the modified URL with a hash attribute based on the predetermined rule. The restored URL is the same as the original URL identified by the device. The device can display both the requested location of the requested web page and the restored URL. After 530, method 500 stops.

A hash attribute in a uniform resource locator (URL) can be used by a device to locate particular information on a page associated with the URL. Normally, a server cannot identify a hash attribute in a URL (that is, the server cannot use the hash attribute to locate particular information on a page). If redirection occurs when the device accesses a URL on the server, the server returns a modified URL by removing the hash attribute and including HTTP 302 redirection header information in the URL. Since the modified URL does not include the hash attribute, the device cannot locate particular information on a page associated with the modified URL. As a result, a user has to manually search for the particular information on the page. The subject matter described in this specification can be used to display a located page returned by a server. For example, a device can replace a hash attribute in a URL with a URL parameter to generate a modified URL. The modified URL can be sent to the server. The server can identify the URL parameter in the modified URL to located particular information on a page associated with the modified URL. As a result, the server can return the located page to the device for displaying the particular information on the page to the user, thereby improving user experience when accessing the URL for the particular information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    identifying, by a device, a uniform resource locator (URL) identifying a requested web page;
    identifying, by the device, a requested location within the requested web page;
    receiving, by the device and from a server, a redirect response including a redirection URL, wherein identifying the URL identifying the requested web page includes identifying the redirection URL as the URL identifying the requested web page, wherein the requested location within the requested web page is identified prior to receiving the redirect response, and wherein the server determines that the device needs to log in to the server before accessing the server based on the URL;

in response to receiving the redirect response, generating, by the device and based on a predetermined rule, a modified URL identifying the requested web page and including a URL parameter corresponding to the requested location and configured to enable the server associated with the modified URL to identify the requested location in the requested web page;

sending, by the device, a request including the modified URL including the URL parameter to the server;

receiving, by the device and from the server, a response including the requested web page identified by the modified URL and an identifier of the requested location in the requested web page, wherein the identifier is different than the URL parameter; and displaying, by the device, the requested location of the requested web page received from the server based on the included identifier.

2. The computer-implemented method of claim 1, wherein the URL and the requested location are identified from user input to an application executing on the device.

3. The computer-implemented method of claim 2, wherein the application is a web browser and the requested location is a hash attribute included in the URL input by a user.

4. The computer-implemented method of claim 2, wherein the identifier of the requested location in the requested web page in the response from the server is a hash attribute associated with the requested location.

5. The computer-implemented method of claim 1, wherein the server determines the requested web page based on the modified URL, and determines the requested location in the requested web page based on the URL parameter in the modified URL.

6. The computer-implemented method of claim 1, wherein the redirect response includes HTTP 302 redirection header information.

7. A non-transitory, computer-readable medium storing one or more instructions executable by a computer system to perform operations comprising:

identifying, by a device, a uniform resource locator (URL) identifying a requested web page;

identifying, by the device, a requested location within the requested web page;

receiving, by the device and from a server, a redirect response including a redirection URL, wherein identifying the URL identifying the requested web page includes identifying the redirection URL as the URL identifying the requested web page, wherein the requested location in the requested web page is identified prior to receiving the redirect response, and wherein the server determines that the device needs to log in to the server before accessing the server based on the URL;

in response to receiving the redirect response, generating, by the device and based on a predetermined rule, a modified URL identifying the requested web page and including a URL parameter corresponding to the requested location and configured to enable the server associated with the modified URL to identify the requested location in the requested web page;

sending, by the device, a request including the modified URL including the URL parameter to the server;

receiving, by the device and from the server, a response including the requested web page identified by the modified URL and an identifier of the requested location in the requested web page, wherein the identifier is different than the URL parameter; and displaying, by the device, the requested location of the requested web page received from the server based on the included identifier.

8. The non-transitory, computer-readable medium of claim 7, wherein the URL and the requested location are identified from user input to an application executing on the device.

9. The non-transitory, computer-readable medium of claim 8, wherein the application is a web browser and the requested location is a hash attribute included in the URL input by a user.

10. The non-transitory, computer-readable medium of claim 8, wherein the identifier of the requested location in the requested web page in the response from the server is a hash attribute associated with the requested location.

11. The non-transitory, computer-readable medium of claim 7, wherein the server determines the requested web page based on the modified URL, and determines the requested location in the requested web page based on the URL parameter in the modified URL.

12. The non-transitory, computer-readable medium of claim 7, wherein the redirect response includes HTTP 302 redirection header information.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

identifying, by a device, a uniform resource locator (URL) identifying a requested web page;

identifying, by the device, a requested location within the requested web page;

receiving, by the device and from a server, a redirect response including a redirection URL, wherein identifying the URL identifying the requested web page includes identifying the redirection URL as the URL identifying the requested web page, wherein the requested location within the requested web page is identified prior to receiving the redirect response, and wherein the server determines that the device needs to log in to the server before accessing the server based on the URL;

in response to receiving the redirect response, generating, by the device and based on a predetermined rule, a modified URL identifying the requested web page and including a URL parameter corresponding to the requested location and configured to enable the server associated with the modified URL to identify the requested location in the requested web page;

sending, by the device, a request including the modified URL including the URL parameter to the server;

receiving, by the device and from the server, a response including the requested web page identified by the modified URL and an identifier of the requested location in the requested web page, wherein the identifier is different than the URL parameter; and displaying, by the device, the requested location of the requested web page received from the server based on the included identifier.

14. The computer-implemented system of claim 13, wherein the URL and the requested location are identified from user input to an application executing on the device.

15. The computer-implemented system of claim 14, wherein the application is a web browser and the requested location is a hash attribute included in the URL input by a user.

16. The computer-implemented system of claim 14, wherein the identifier of the requested location in the requested web page in the response from the server is a hash attribute associated with the requested location.

17. The computer-implemented system of claim 13, wherein the server determines the requested web page based on the modified URL, and determines the requested location in the requested web page based on the URL parameter in the modified URL.

18. The computer-implemented system of claim 13, wherein the redirect response includes HTTP 302 redirection header information.

\* \* \* \* \*